United States Patent
Kissee

(10) Patent No.: US 6,567,665 B1
(45) Date of Patent: May 20, 2003

(54) METHOD AND APPARATUS FOR REDIRECTING CALLS IN A WIRELESS COMMUNICATIONS SYSTEM

(75) Inventor: Gregory Vincent Kissee, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/362,790

(22) Filed: Jul. 28, 1999

(51) Int. Cl.[7] .................................................. H04Q 7/20
(52) U.S. Cl. ....................... 455/436; 455/437; 455/439; 455/512; 455/453
(58) Field of Search ................................ 455/450, 453, 455/509, 510, 512, 513, 514, 515, 516, 517, 524, 525, 437, 438, 439, 443, 436

(56) References Cited

U.S. PATENT DOCUMENTS

| | | | | |
|---|---|---|---|---|
| 4,670,899 A | * | 6/1987 | Brody et al. ................. | 455/453 |
| 5,287,545 A | * | 2/1994 | Kallin ......................... | 455/510 |
| 5,293,641 A | * | 3/1994 | Kallin et al. ................. | 455/453 |
| 5,487,101 A | * | 1/1996 | Fletcher ....................... | 455/443 |
| 6,081,713 A | * | 6/2000 | Desgagne .................... | 455/437 |

* cited by examiner

Primary Examiner—Quochien Vuong

(57) ABSTRACT

A method and apparatus in a communications system for handling overload conditions in a cell. Mobile assisted channel allocation information is used to identify an adjacent channel for use in directing a mobile station. The communications system monitors for attempts by the mobile station to access a first cell in an overloaded state. When such an access is detected, information is obtained for cells adjacent to the first cell. A second cell is identified from the cells adjacent to the first cell using the mobile assisted channel allocation information and a message is sent to the mobile station to access the second cell.

54 Claims, 10 Drawing Sheets

| INFORMATION ELEMENT | TYPE |
|---|---|
| 502 — PROTOCOL DISCRIMINATOR | M |
| 504 — MESSAGE TYPE | M |
| 506 — MACA_STATUS | M |
| 508 — MACA_TYPE | M |
| 510 — MACA_8_CONTROL | O |
| 512 — MACA_LIST | O |
| 514 — MACA_LIST (OTHER HYPERBAND) | O |

PROTOCOL DISCRIMINATOR: IS-136
MESSAGE TYPE: MACA
MACA_STATUS: STM ENABLED
MACA_TYPE: REPORT MACA ON ORIGINATIONS AND PAGE RESPONSES
MACA_8_CONTROL: NO RESTRICTIONS
MACA_LIST: NUMBER OF CHANNELS=6
    767   782
    772   787
    777   792

*FIG. 6*

| INFORMATION ELEMENT | TYPE |
|---|---|
| 702 — PROTOCOL DISCRIMINATOR | M |
| 704 — MESSAGE TYPE | M |
| 706 — LTM MEASUREMENT | O |
| 708 — STM MEASUREMENT | O |
| 710 — STM MEASUREMENT (OTHER HYPERBAND) | O |

| INFORMATION ELEMENT | TYPE |
|---|---|
| PROTOCOL DISCRIMINATOR | M |
| MESSAGE TYPE | M |
| LAST TRY | M |
| RCF AND AUTH | O |
| DTX SUPPORT | O |
| RETRY CHANNEL | O |
| SUBADDRESS | O |

FIG. 8

| INFORMATION ELEMENT | TYPE |
|---|---|
| PROTOCOL DISCRIMINATOR | M |
| MESSAGE TYPE | M |
| DVCC | M |
| DMAC | M |
| CHAN | M |
| ATS | M |
| SB | M |
| PROTOCOL VERSION | M |
| TIME ALIGNMENT | M |
| DELAY INTERVAL COMPENSATION MODE | M |
| VOICE MODE | O |
| SUBADDRESS | O |
| MESSAGE ENCRYPTION MODE | O |
| HYPERBAND INFORMATION | O |
| DISPLAY | O |

FIG. 9

| INFORMATION ELEMENT | TYPE |
|---|---|
| 1002 PROTOCOL DISCRIMINATOR | M |
| 1004 MESSAGE TYPE | M |
| 1006 MEM | M |
| 1008 SCC | M |
| 1010 VMAC | M |
| 1012 CHAN | M |
| 1014 PROTOCOL VERSION | M |
| 1016 SUBADDRESS | O |
| 1018 DTX SUPPORT | O |
| 1020 DISPLAY | O |

| BEST TO WORST RANKING | PRIORITIZATION DESCRIPTION OF ADJACENT CELLS |
|---|---|
| 1 (BEST CANDIDATE) 1102 | • Not in overload state<br>• Offer voice channel resource types requested by mobile<br>• Offer the same feature set as the service cell<br>• Has the 1st strongest signal strength as reported by mobile in MACA report |
| 2 1104 | • Not in overload state<br>• Offer voice channel resource types requested by mobile<br>• Offer the same feature set as the service cell<br>• Has the 2nd strongest signal strength as reported by mobile in MACA report |
| ⋮ 1106 | • Not in overload state<br>• Offer voice channel resource types requested by mobile<br>• Offer the same feature set as the service cell<br>• Has the Nth strongest signal strength as reported by mobile in MACA report |
| N+1 1108 | • Not in overload state<br>• Offer voice channel resource types requested by mobile<br>• Does not offer the same feature set as the service cell<br>• Has the 1st strongest signal strength as reported by mobile in MACA report |
| N+2 1110 | • Not in overload state<br>• Offer voice channel resource types requested by mobile<br>• Does not offer the same feature set as the service cell<br>• Has the 2nd strongest signal strength as reported by mobile in MACA report |
| ⋮ 1112 | • Not in overload state<br>• Offer voice channel resource types requested by mobile<br>• Does not offer the same feature set as the service cell<br>• Has the Nth strongest signal strength as reported by mobile in MACA report |

METHOD AND APPARATUS FOR REDIRECTING CALLS IN A WIRELESS COMMUNICATIONS SYSTEM

FIELD OF THE INVENTION

The present invention relates generally to an improved communications system and in particular the present invention provides a method and apparatus for redirecting calls in a communications system. Still more particularly, the present invention provides a method and apparatus for redirecting calls in an overloaded cell in a wireless communications system.

BACKGROUND OF THE INVENTION

The recent surge in the popularity of cellular radio and mobile service in general has resulted in an overall increase in traffic and a shortage of available system capacity in large metropolitan areas. Current cellular systems exhibit a wide range of traffic densities, from low in rural areas to overloading in downtown areas, with large daily variations between peak hours and quiet night hours. It is a system engineering challenge to design a communications system that will make optimal use of the available frequency spectrum and offer a maximal traffic throughput (e.g. erlangs/megahertz/service area) at an acceptable service quality. In a cellular environment, the overall system capacity in a given service area is a product of many (complexly interrelated) factors, such as, the available frequency spectra, service quality, traffic statistics, type of traffic, type of protocol, shape and size of service area, selected antennas, diversity, frequency reuse capability, spectral efficiency of coding and modulation schemes, and efficiency of multiple access.

One problem encountered in wireless communications systems is the problem associated with an "overload" condition in a cell. An "overload" condition is defined as a cell that is in-a state in which all voice channel resources allocated for call setup are currently in use. When a cell is in an overload condition, all access attempts to this cell will beyond this point either fail or be re-directed by the communications system to an adjacent cell, depending on how the communications system is configured. If the communications system is configured for "directed retry", the communications system will re-direct mobile accesses once a certain voice channel resource threshold is reached.

With directed retry in older cellular systems, a mobile station attempts to access the communications system. The communications system receives the access attempt. If the communications system determines that the cell on which the access attempt has occurred is in an overload condition, the communications system sends a directed retry message to the mobile station. In this example, the message is sent with 1 to 6 possible adjacent cell analog control channel (ACCH) offsets. The mobile station receives this directed retry message, attempts to find the best possible ACCH based on the channel offsets received, and re-attempts the access on the best ACCH identified.

One limitation with this type of mechanism that the communications system is unaware of is the best adjacent ACCH to which the call should be redirected. Since the communications system can only send down a list of ACCH offsets to the mobile station based on system configured adjacent cell information and has no idea as to which one the mobile station will select, the communications system also cannot specify feature specification information (i.e., authentication) to the mobile station because the communications system is not sure on which cell the mobile station will re-access.

Directed retry on the newer digital control channel (DCCH) in a communications system under Interim Standard (IS) 136 has limitations as well. IS 136 was developed by the Cellular Telecommunications Industry Association (CTIA). With IS 136 and DCCHs, directed retry was enhanced to support two methods of operation. The first method mimics that of directed retry on an ACCH. Once the system determines that the cell is in an overload condition and a mobile station access is attempted on that cell, the communications system can send a directed retry message down to the mobile station with channel specific information for the mobile station to use to re-access an adjacent cell. The second method of directed retry on a DCCH in an IS 136 system allows the communications system to just send a directed retry to the mobile station without any channel specific information. The mobile station can then use neighbor cell list information being broadcast on the serving DCCH to determine which adjacent cells are marked as directed retry cells. The mobile station then executes reselection procedures as defined in IS 136 to determine the next best ACCH or DCCH on which to re-attempt the access. The mobile station only attempts reselection to the adjacent cells that have been marked as directed retry cells in the neighbor cell message. Both of these methods of re-directing a mobile station's access due to cell overload have the same limitations as on ACCHs. For example, the communications system has no idea where the mobile station will re-attempt the access. Since the communications system has no idea on which cell the mobile station will re-attempt the access, the communications system cannot inform the mobile station of specific features available on the cell to which the mobile station is beign re-directed—read control filler (RCF) and authentication (AUTH) if being re-directed to any ACCH. Further, the mobile station may attempt to re-access on an adjacent cell, which is also in an overload state. This situation would cause unnecessary messaging on the communications system. Moreover, processing of the directed retry secnario may not be carried out exactly the same by different model mobile stations. This situation leads to difference in how mobile stations are being redirected within the same cell.

Therefore, it would be advantageous to have an improved method and apparatus for redirecting mobile stations attempting access to cell in an overload condition.

SUMMARY OF THE INVENTION

The present invention solves problems associated with redirecting a call by a mobile station accessing an overloaded cell in a wireless communications system. The mechanism of the present invention uses mobile assisted channel allocation information to identify an adjacent channel for use in redirecting a mobile station. The communications system monitors for attempts by the mobile station to access a first cell in an overloaded state. While in an idle state, the mobile station may monitor and store signal strengths in cells adjacent to the first cell in which a mobile station is located. When such an access is detected, information is obtained from the mobile station for cells adjacent to the first cell. A second cell is identified from the cells adjacent to the first cell using the information, and a message is sent to the mobile station to access the second cell.

The information sent to the communications system by the mobile station includes signal strengths for the adjacent cells. The information is sent in a report that may be initiated by the communications system. The second cell may be selected by prioritizing the adjacent cells. The ranking or prioritizing of the cells is made from adjacent cells that are not in an overload state and may be based on the signal strengths returned by the mobile station. Other factors also may be used to rank or prioritize the adjacent cells, such as, for example, whether the voice channel resources match those requested by the mobile station and whether features in first cell are found in adjacent cells, and whether the system determines that the cell will have sufficient quality to set up on an adjacent cell.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating the contents of a mobile assisted channel allocation (MACA) message depicted in accordance with the preferred embodiments of the present invention;

FIG. 6 is an example of a MACA message depicted in accordance with a preferred embodiment of the present invention;

FIG. 7 is an illustration of a MACA report message depicted in accordance with the preferred embodiments of the present invention;

FIG. 8 is a diagram of a directed retry message depicted in accordance with a preferred embodiment of the present invention;

FIG. 9 is a diagram of a digital traffic channel designation message depicted in accordance with a preferred embodiment of the present invention;

FIG. 10 is a diagram illustrating an analog voice channel designation message depicted in accordance with a preferred embodiment of the present invention;

FIG. 11 is a diagram illustrating ranking of cells based on data returned by mobile station depicted in accordance with the preferred embodiment of the present invention;

DETAILED DESCRIPTION OF THE PREFERRED EMBODIMENT

Figure 1:
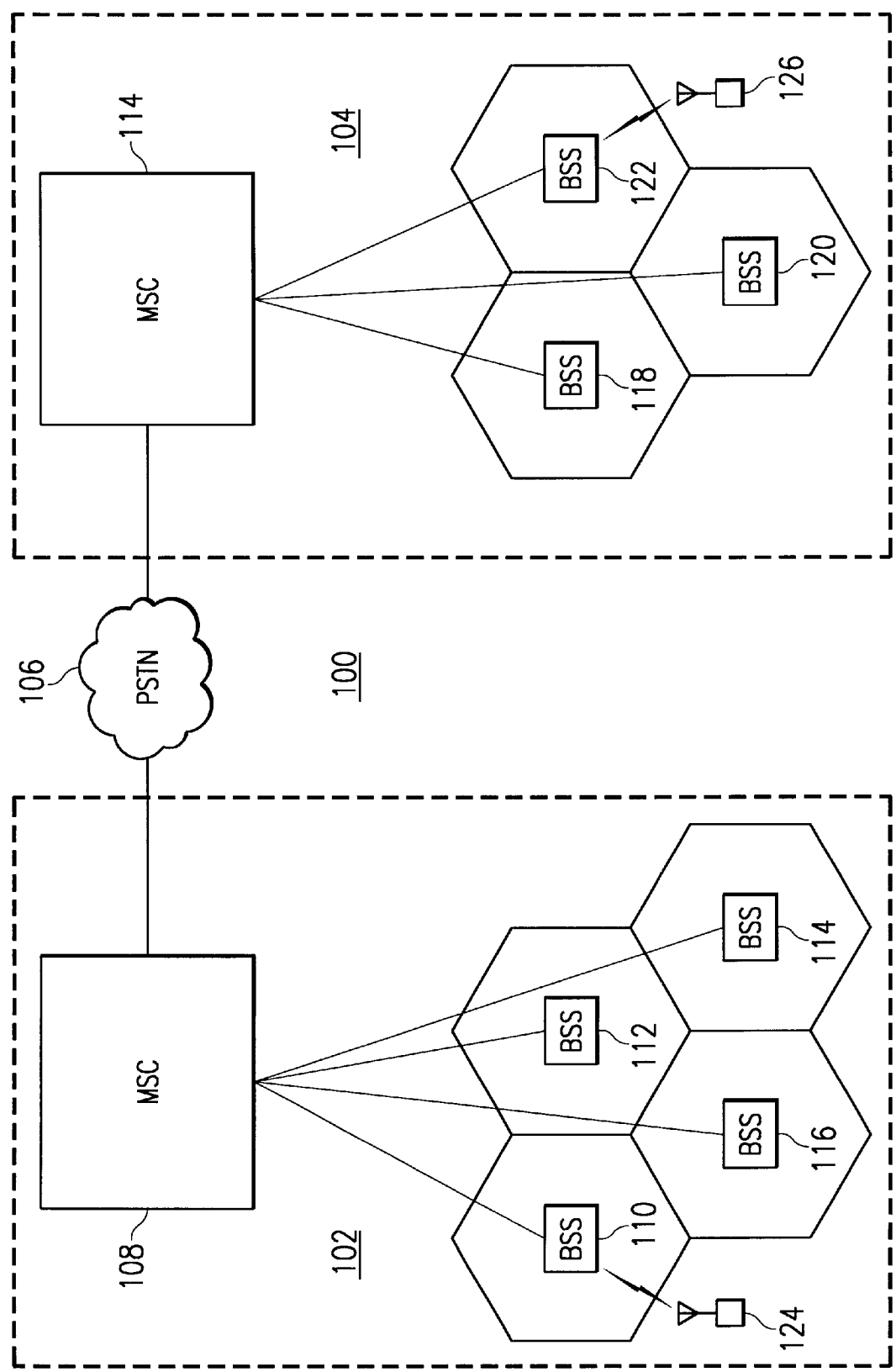
FIG. 1 is a diagram of a communications system depicted in accordance with a preferred embodiment of the present invention.

With reference to the figures and in particular with reference to FIG. 1, a diagram of a communications system is depicted in accordance with a preferred embodiment of the present invention. Communications system 100 includes multiple cellular systems covering a geographical region. In particular, communications system 100 includes wireless communications systems in the form of cellular system 102 and cellular system 104. In the interest of clarity, FIG. 1 depicts only two such cellular systems. In addition, also depicted in communications system 100 is a public switch telephone network (PSTN) 106. Cellular systems 102 and 104 are time division multiple access (TDMA) wireless communications systems implementing IS 136 in the depicted example.

In the depicted example, cellular system 102 includes a mobile service switching center (MSC) 108, and base substations (BSSs) 110–116. Similarly, cellular system 104 includes a MSC 114, and BSSs 118–122. Also illustrated in FIG. 1 are mobile stations 124 and 126. These mobile stations are also called "mobile communications units" and may be for example, a cellular phone. For reference with subsequent discussions, the cell in which the mobile system is initially accessing is called the "serving cell" while the cell to which the mobile station is redirected is called the target cell. In the depicted examples, the target cell is a cell adjacent to a serving cell.

MSC 108 and MSC 114 are coupled to PSTN 106 through a T1 line that is well known in the art. In the depicted example, the T1 line is a Northern American standard signal line. The international standard E1 can be used in the same manner. The signal line conducts a pulse code modulated (PCM), 24 channel, serial signal between PSTN 106 and MSCs 108 and 114. MSCs 108 and 114 perform switching of a call from PSTN 106 to the appropriate cellular system and vice versa. These MSCs also validate a subscriber mobile station to determine if the subscriber is resident of the system or a roamer by using home location register/visitor location register (HLR/VLR) databases of mobility networks.

BSSs 110–116 and BSSs 118–122 are cell site equipment used to communicate with mobile stations, such as mobile stations 124 and 126. Each BSS includes a base station controller (BSC) and several base transceiver stations (BTSs). The BSC is located at the cell. A BSC locates mobile stations to a cell, performs call set up, call supervision, and call termination. A BSC usually contains speech processing units, a call controller, a central processor, a maintenance and test unit, and digital trunk interfaces. A BTS provides RF for radiation and reception with an appropriate channel access mechanism (e.g. TDMA) and voice data transmission interfaces between itself and the BSC. BTS typically contains several receive and transmit antennas, RF distributor, modulators and demodulators, and T1/E1 trunk line interfaces for voice and data traffic. FIG. 1 illustrates four BSSs (110–116) in cellular system 102 and three BSSs (118–122) in cellular system 104 for illustrative purposes only. Of course, other numbers of BSSs may be employed for source and target systems.

When mobile station 124 initiates a call, a determination is made as to whether the target system is a mobile station, such as mobile station 126, or a fixed station or landline station, such as a telephone attached to PSTN 106. If the call is to a fixed station, the communications path extends from BSS 110 to MSC 108. In turn, MSC 108 establishes a communications path with PSTN 106 to generate a communications path to the target station.

The cellular system according to the present invention may be implemented using presently available cellular systems with modifications to implement the processes and apparatus of the present invention.

Figure 2:
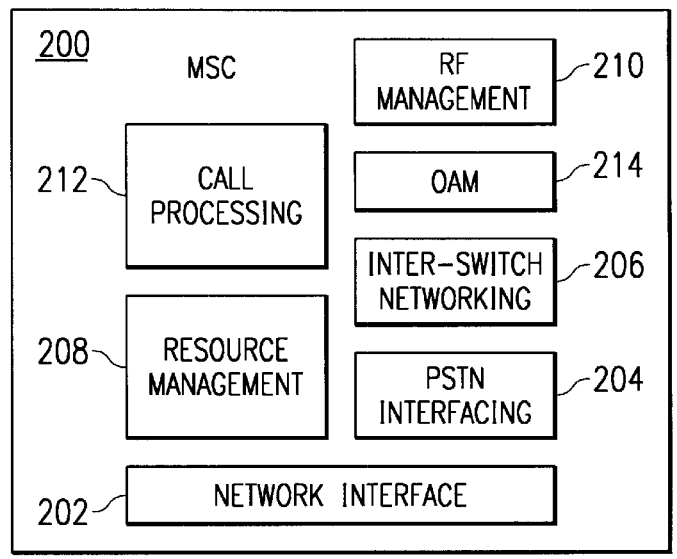
FIG. 2 is a block diagram of a mobile switching center (MSC) depicted in accordance with a preferred embodiment of the present invention.

With reference now to FIG. 2, a block diagram of a mobile switching center (MSC) is depicted in accordance with a preferred embodiment of the present invention. MSC 200 is an example of MSC 108 or MSC 114 in FIG. 1. MSC 200 is used to coordinate the setting up of calls from various mobile stations. MSC 200 is a switch used to route traffic to or from mobile stations. In this example, MSC 200 includes a network interface 202, which provides an interface to communicate with a BSC. PSTN interfacing 204 provides an interface to a PSTN. PSTN interfacing 204 includes the signaling protocols needed to communicate with a PSTN. For example, CCS7 protocols may be used. Inter-switch networking 206 is used to provide communication with other MSCs in the communication system. Resource management 208 is used to manage resources at the cell sites and make channel assignments. RF management 210 is used to manage situations involving the radio frequency. RF management 210 will handle mobile stations having poor RF reception. For example, RF management 210 is used in hand off processing and power control methods. Call processing 212 provides all call handling processes. For example, call processing 212 will handle routing of the call to the correct cell as well as call set up and validation of mobile stations.

Operation administration and maintenance (OAM) 214 provides network control functions. For example, OAM 214 provides functions, such as, for example, collecting statistics on subscribers and mobile stations. OAM 214 also provides information for security management, such as information used by call processing 212 to validate a mobile station. In the depicted example, OAM 214 includes the collection and storage of cell adjacency information configured by a MSC or RF engineer. Additionally, the information in OAM 214 also is used by RF management 210 to identify cells for redirection. This information may be broadcast back to all mobile stations within a cell through a mobile assisted channel allocation (MACA) message. Although in the depicted example, processes of the present invention are implemented in RF management 210, these processes may be implemented in other parts of the communications system. For example, the processes also may be implemented within call processing 212 in MSC 200.

Figure 3:
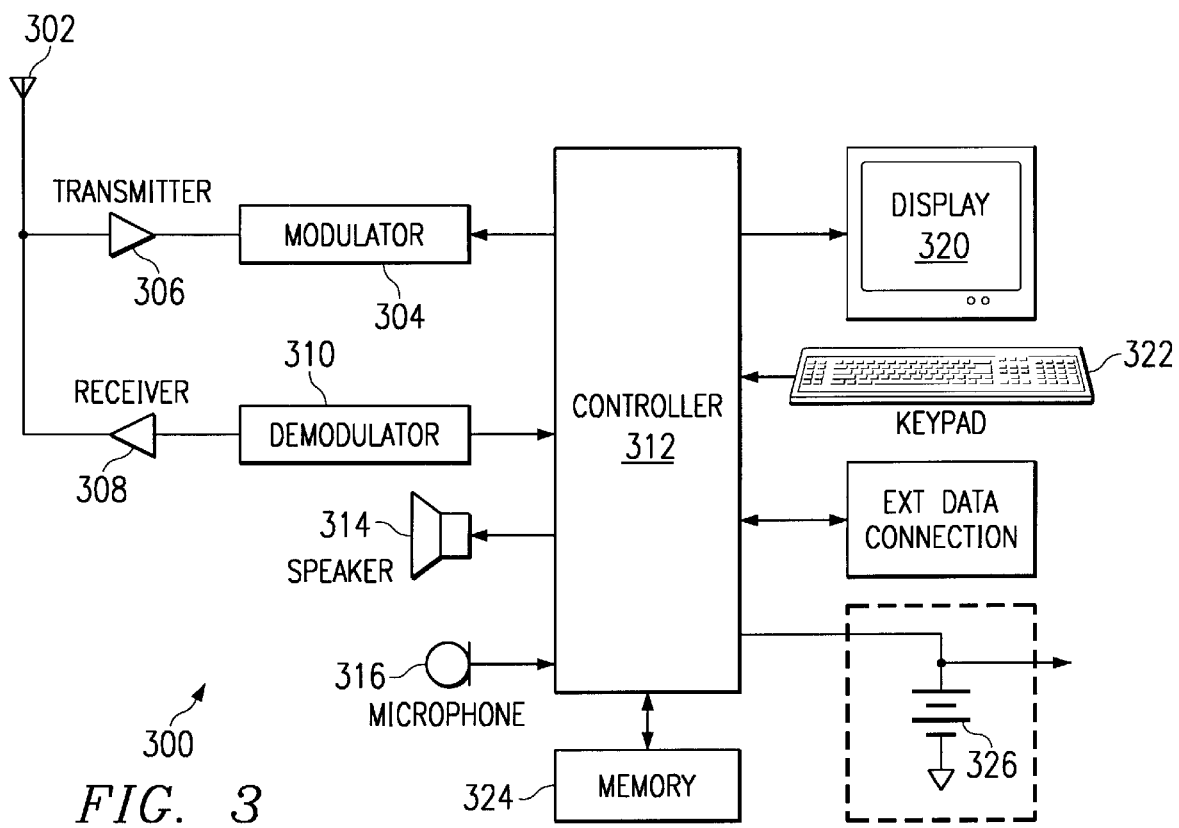
FIG. 3 is a block diagram of a mobile station depicted in accordance with a preferred embodiment of the present invention.

With reference now to FIG. 3, a block diagram of a mobile station is depicted in accordance with a preferred embodiment of the present invention. Mobile station 300 includes an antenna 302 for transmitting signals to and receiving signals from a BTS. Mobile station 300 also includes a modulator 304, a transmitter 306, a receiver 308, a demodulator 310, and a controller 312. Controller 312 provides signals to and receives signals from transmitter 306 and receiver 308, respectively. These signals include signaling information following the air interface standard of the applicable cellular system and also use speech and/or user generated data. In addition, controller 312 also may include circuitry used for implementing the audio and logic functions of mobile station 300, including the functions for periodic re-registration in response to receiving a paging signal requesting registration of the mobile station. Controller 312 may include a digital signal processor device, a microprocessor device, and various analog to digital converters, digital to analog converters, and other support circuits. The control and signal processing functions of mobile station 300 are allocated between these devices.

Mobile station 300 also includes a speaker 314, a microphone 316, a display 320, and a keypad 322, all of which are coupled to controller 312. In this example, mobile station 300 also includes a memory 324, which is used to store numbers and various other constants and variables used by controller 312 during operation of mobile station 300. In addition, mobile station 300 in this example is powered by a battery 326.

In the depicted examples, mobile stations, such as mobile station 300 will continuously monitor several channels and maintain an average signal strength measurement on each channel while camping on its current DCCH. The mobile station will require a channel list from the serving DCCH in the serving cell. In the depicted examples, a serving cell is a cell in which a mobile station initially attempts access. While in an idle mode, a mobile station will normally monitor signal strengths in cells adjacent to the serving cell. In the depicted examples, these signal strengths are averaged and stored within the mobile station. On the broadcast control channel (BCCH), fast BCCH (FBCCH) or extended BCCH (EBCCH), MACA messages are broadcast to all mobile stations in a cell's coverage area. The mobile station will report the last average signal strength for each measured channel in access messages defined by the serving DCCH. The serving DCCH will control which access message the data is reported to by the mobile station. This control is accomplished by broadcasting the list of access messages in the BCCH. This information is used by the network (e.g. a MSC in a communications system) to identify adjacent cells which are the best ones to which the mobile station should be directed or redirected.

Figure 4:
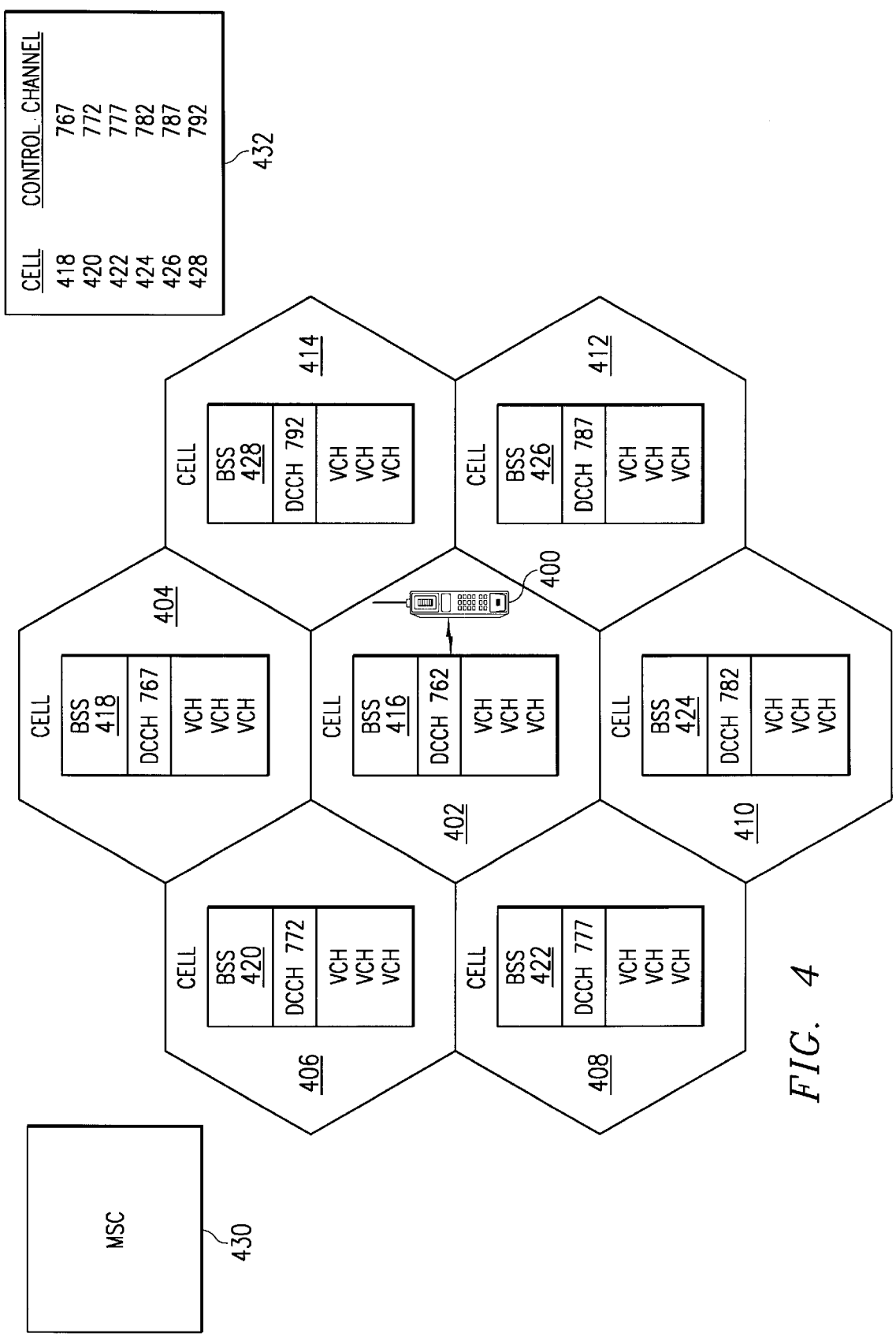
FIG. 4 is a diagram of a mobile station in an overloaded cell depicted in accordance with a preferred embodiment of the present invention.

With reference to FIG. 4, a diagram of a mobile station in an overloaded cell is depicted in accordance with a preferred embodiment of the present invention. In the depicted example, mobile station 400 is located in cell 402, which is an overloaded cell in this example. Cells 404, 406, 408, 410, 412, and 414 are adjacent cells to cell 402. BSSs 416–428 are located in cells 402–414 respectively. Each of these cells is associated with a control channel, a DCCH, generated by the BSS. Each cell also has a number of VCHs provided through the BSS in the cell. The message flow and message descriptions described herein are illustrated for use in TDMA system, but are not intended as a limitation on the type of communications system in which the present invention may be implemented.

Adjacent cells are identified for the cell in an overload state, cell 402, using cell adjacency information, which is stored by the OAM in MSC 430 in this example. The ACCHs and/or DCCHs of the adjacent cells are included in a MACA message broadcast on the serving DCCH in cell 402. This MACA message is configured to cause mobile stations to report MACA information on broadcast adjacent ACCHs/DCCHs in all originations and page responses. The MACA message is configured to have short term MACA (STM) measurements made and reported by the mobile station for each channel in the list. Mobile stations, while in the idle mode on the serving DCCH, continuously take signal strength measurements on the adjacent channels and maintain average signal strength readings for each channel.

In this example, mobile station 400 attempts to access cell 402 through BSS 416 using DCCH 762. The cell that a mobile station attempts to access is referred to as the "serving cell". This access may be in the form of an origination or page response. Mobile station 400 maintains signal strength information from the cells adjacent to cell 402 and sends this information in a MACA message back to MSC 430. As mentioned above, this signal strength information is gathered while the mobile station is in an idle mode in the depicted examples. In turn, MSC 430 will identify the adjacent cells adjacent to cell 402 that are the best candidates for mobile station 400 to access. Record 432 is an example of information stored within MSC 430 regarding MSC cell adjacency configuration information. Record 432 is used for two reasons in the depicted examples. First, the record is used to maintain the MACA message on the serving cell. Second, the record is used for intelligent decision making to identify the best cell to which the call should be redirected based on MACA report information sent up in the access message from the mobile station. For cell 402, the adjacency information in record 432 contains a cell identifier and a control channel.

When cells are identified by MSC 430, the mobile station may be redirected to a new cell or channel. The new cell is called the "target cell". The present invention provides two mechanisms for this although other mechanism may be used. In the first mechanism, implementing directed retry is not needed because the communications system knows which adjacent cell that would best serve the mobile station based on MACA report information and other information at the MSC. This information at the MSC includes, for example, overload conditions of adjacent cells, voice channel type availability of cells adjacent to the serving cell, and features available at the adjacent cells. Since the system has this information, the communications system then checks the resources available on the adjacent cells to determine if VCH resources are available. If resources are available, the communications system formats a channel designation message (IVCD for analog voice or DTCD for digital traffic channel) with the "CHAN" field of this message set to the VCH resource available on the adjacent cell. The system then sends this message to the mobile over the serving DCCH. The mobile station receives the message, re-tunes to a channel specified in "CHAN" field of message along with setting its SAT or DVCC per that of the message and attempts to acquire the VCH on the adjacent cell. While the message is sent to the mobile station, the system allocates the VCH in the adjacent cell for this call.

This first mechanism has several distinct advantages in that it decreases the amount of messaging needing to occur on the system to redirect a call. If directed retry was performed in this scenario, a directed retry message would need to be sent to the mobile. The mobile would then re-attempt the access on an adjacent cell (origination or page response), and the system would then possibly send down a channel designation message to setup the mobile on a VCH. Further, this mechanism increases the speed at which a call is setup when in a cell that is an overload condition. The speed of call setup is increased since the best adjacent cell is already known when the access is attempted due to the MACA report information. Therefore, call setup is immediate rather than going through the process of directed retry. Also, the chance that the access will be successful increases because the communications system can check the resources available on adjacent cells before attempting to setup the call there.

Moreover, calls may be routed more precisely based on the features requested/supported by the mobile since the system has access to the supported features of adjacent cells and resources available on each (i.e., service code, vocoder, voice privacy, data mode, message encryption mode). This mechanism also gives the communications system the ability to setup the call to a VCH in an adjacent cell that will cause the least amount of radio frequency (RF) interference in the network.

A second mechanism is illustrated for handling a mobile station accessing a cell in an overload state once one or more adjacent cells have been identified based on MACA report information received in an access attempt. The communications system formats a directed retry message on the DCCH and specifies in the message the specific, prioritized channel list of adjacent cells that the communications system would like for the mobile to re-attempt access on. This list is prioritized by the communications system based on best-to-worst adjacent signal strength readings acquired from the MACA report information sent in by the mobile with the access attempt.

This option has some distinct advantages over presently available mechanisms. First the communications system can now re-direct the mobile to a cell that it knows is the best candidate and which has resources available. Processing time of setting up the call is decreased because the mobile does not need to perform reselection procedures to identify the best candidate cell. The likelihood of the call being accepted by the adjacent cell is increased because the system can check the resources requested by the mobile station and compare that to resources available in the adjacent cells to determine the best cells to which the mobile station is to be redirected.

In, FIGS. 5–10, examples of messages used by the processes of the present invention are illustrated. These messages are examples of existing message formats used in TDMA wireless systems. The processes of the present invention selectively identify and set certain information elements in these messages to provide the redirect mechanism for managing mobile stations attempting access in a serving cell that is in an overloaded state.

With reference now to FIG. 5, a diagram illustrating the contents of a MACA message is depicted in accordance with a preferred embodiment of the present invention. MACA message 500 is an example of a message that may be sent to all mobile stations in a cell, such as mobile station 400 in FIG. 4 to cause the mobile station to continuously gather signal strength information on adjacent channels for adjacent cells while in an idle state. This message also causes the mobile station to send measurements from channels served by cells adjacent to the cell serving the mobile station in or with access messages.

MACA message 500 includes information elements and type identifiers. In this example, MACA message 500 includes protocol discriminator 502, a message type 504, a MACA_STATUS 506, a MACA_TYPE 508, a MACA_8_CONTROL 510, a MACA_LIST 512, and a MACA_LIST (Other Hyperband) 514. MACA message 500 may be either a mobile assisted channel allocation message or a mobile assisted channel allocation multi-hyperband message. Both of these types of messages are the same except for that in a MACA multi-hyperband message, a MACA_LIST other hyperband parameter is included. MACA message 500 is broadcast on the DCCH. This message can be sent either on the FBCCH or EBCCH logical subchannels on the DCCH in these examples. MACA message 500 is employed to order the mobile station to report radio measurements on certain channels. MACA message 500 includes information regarding the channels the mobile station is to measure and when to report the measurements for mobile assisted allocation.

Protocol discriminator 502 is an information element used to identify the layer 3 protocol used for the message being sent. In the depicted example, the layer 3 protocol is a message layer in a set of three air interface layers: radio transmission, logical channels, and messages. Message type 504 is an information element identifying the message as a unique type to the receiver. This field is always set by a network based on the message being transmitted.

MACA_STATUS 506 is an information element used to determine which MACA function combinations are enabled. Two function types are present: short term MACA (STM) and long term MACA (LTM). In the depicted examples only STM measurement is enabled. STM Measurements are short term receiver signal strength measurements on the serving channel as well as all channels indicated in the MACA_LIST (or MACA_LIST (other hyperband)).

MACA-TYPE 508 is an information element used to determine when MACA reporting is to take place. The network controls when the mobile sends in MACA report information based on this parameter. In these examples, four possible scenarios are present when the network can require that MACA report information be sent in: audit confirmations, page responses, originations, and registrations. This parameter is in a BITMAP format so that any combination of selections can be chosen. In the depicted example, MACA Report information is sent in for originations and page responses. MACA_8_CONTROL 510 is an information element, together with MACA_TYPE and MACA_STATUS, used to determine the number of channels reported. Settings of this field are based on the amount of adjacencies or channels on which the network wants the mobile to report. This parameter may be transmitted indicating either option in the depicted examples. A value of 0 indicates that page response and origination are restricted to 8 channels other than current DCCH. A value of 1 indicates that no MACA report restrictions are present.

MACA_LIST 512 is an information element containing information regarding the channels, other than the current DCCH, the mobile station shall measure for mobile assisted channel allocation. This parameter contains all adjacent control channels to the serving cell. This parameter is populated or filled by the MSC using record 432 in FIG. 4. Broadcasting this information will make the mobile station take measurements on all adjacent cells with respect to its serving cell. MACA_LIST (Other Hyperband) 514 is an information element containing information regarding the channels other than the current DCCH. A mobile station that is not capable of performing measurements on a channel specified in this list shall report a RSS value of 00000 for that channel. This parameter is used in these examples if both hyperbands are being supported by this network (e.g. 800 MHz and 1900 MHz bands).

In FIG. 6, an example of a MACA message is depicted in accordance with a preferred embodiment of the present invention. MACA message 600 includes an example of parameters for the various elements illustrated in MACA message 500 in FIG. 5 for the scenario depicted in FIG. 4. MACA message 600 would be broadcast by the DCCH in the serving cell. Mobile station 400 in FIG. 4 would receive this message and make STM measurements on channels 767, 772, 777, 782, 787, and 792. These measurements are made continuously while camping on the DCCH and in the idle state. Mobile station 400 will maintain averaged signal strength readings for each channel adjacent to that of the serving cell.

With reference now to FIG. 7, an illustration of a MACA report message is depicted in accordance with the preferred embodiments of the present invention. MACA report message 700 is an example of a message that is sent from a mobile station back to the network. This message is used on a DCCH reverse access channel. The message is employed to communicate measurement information gathered by the mobile station. MACA report message 700 contains the following information elements: the protocol discriminator 702, a message type 704, a LTM measurement 706, a STM measurement 708, and a STM measurement (other hyperband) 710.

Protocol discriminator 702 is an information element used to identify the layer 3 protocol used for the message being sent. Message type 704 is an information element that identifies the message as a unique type to the receiver. This field is set by mobile station based on message being transmitted. LTM measurement 706 is an information element that provides the channel quality and LT_RSS of the current channel in the MACA report. This parameter is not sent by the mobile station if not requested in the MACA Broadcast Message (MACA_STATUS).

STM measurement 708 is an information element used to send the measured signal strength of the MACA channels to the network.. Since this is requested by the network in the MACA Broadcast message (MACA_STATUS), this element is information that the network uses to make intelligent decisions of where to direct this call. STM measurement (Other Hyperband) 710 is an information element used to provide the measurement status of MACA channels not included in the STM measurement 708 element. This parameter is used in the case where the network has 800 and 1900 channels associated with it. This parameter allows a mobile station to report on channels that are at a different "hyperband" than the one on which the mobile station is currently operating. This parameter is only needed to be sent in by the mobile station if the network broadcasts the Mobile Assisted Channel Allocation (Multi Hyperband) forward broadcast message along with the MACA Message.

With reference now to FIG. 8, a diagram of a directed retry message is depicted in accordance with a preferred embodiment of the present invention. Directed retry message 800 includes a protocol discriminator 802, message type 804, last try 806, read control filler (RCF) and authentication (AUTH) 808, discontinuous transmission (DTX) support 810, retry channel 812, and subaddress 814. Directed retry message 800 is used to force a mobile station to reject the. current DCCH in the serving cell and re-attempt access on an alternate control channel from a list of channels. In the depicted examples, up to six instances of retry channel 812 may be included in directed retry message 800. Directed retry message 800 is sent on DCCH and in particular on subchannels, such as, for example, SMS, paging, and access response channel.

Protocol discriminator 802 is an information element used to identify the layer 3 protocol used for the message being sent. Message type 804 is an information element that identifies the message as a unique type to the receiver. Sending unit (system or mobile) will always set field. Last try 806 is used if a mobile station receives a directed retry message and attempts a new access on another DCCH, it shall set the last try flag in the origination or the page response message to the value of the last try flag received in the directed retry message. Otherwise, the mobile station sets the last try flag to disabled at system access. RCF and AUTH 808 is an information element type of flag that indicated whether or not the mobile station is to read control filler information and send authentication information when making an access on an ACCH as a result of a directed retry received on the DCCH. The RCF bit of this message is deciphered as: 0=do not read RCF; 1=read RCF. The AUTH bit of this message is deciphered as: 0=authentication disabled; 1=authentication enabled. DTC support 810 is a message element used to indicate DTC capabilities supported on the analog voice channel.

Retry channel 812 is an information element used to specify a channel to be considered for directed retry purposes. This information element is set by the processes of the present invention to the target cell to which the mobile station is to be redirected. The channel identified in this information element shall also be included in the neighbor cell message or the neighbor cell (multi-hyperband) message. Two parts to this information element are present: hyperband and channel. These parts are defined as follows: hyperband is 00=800 MHz; 01=1900 MHz while channel is set per IS 136 channel definitions for 800 and 1900 MHz bands allocated by the FCC. Subaddress 814 is an information element that identifies the subaddress of a called or calling party. Of the elements illustrated within directed retry message 800, retry 812 is the information element specified by the processes of the present invention when selecting a target channel.

With reference next to FIG. 9, a diagram of a digital traffic channel designation message is depicted in accordance with a preferred embodiment of the present invention. Digital traffic channel designation message 900 includes the following information elements: protocol discriminator 902, message type 904, DVCC 906, DMAC 908, CHAN 910, ATS 912, SB 914, protocol version 916, time alignment 918, delay interval compensation mode 920, voice mode 922, subaddress 924, message encryption mode 926, hyperband info 928, and display 930. Digital channel designation message 900 is used to assign a mobile station to a digital traffic channel. Digital traffic channel designation message 900 is sent on DCCH and in particular on subchannels, such as, for example, SMS, paging, and access response channel (SPACH).

Of these information elements, DVCC 906 and CHAN 910 are information elements filled by the processes of the present invention. The other illustrated information elements are those normally found in a digital traffic channel designation message and are not affected by the processes of the present invention. DVCC 906 defines the digital verification color code (DVCC) for use in the call. This information element is a 12-bit field permitting 255 distinct values in the depicted example. CHAN 910 is an information element set by the processes of the present invention for the channel of the target. This value is set according to IS 136 channel definitions for 800 MHz and 1900 MHz bands.

In FIG. 10, a diagram illustrating an analog voice channel designation message is depicted in accordance with a preferred embodiment of the present invention. Analog voice channel designation message 1000 includes the following information elements: protocol discriminator 1002, message type 1004, MEM 1006, SCC 1008, VMAC 1010, CHAN 1012, protocol version 1014, subaddress 1016, DTX support 1018, and display 1020. Analog voice channel designation message 1000 is sent on DCCH and in particular on subchannels, such as, for example, SMS, paging, and access response channel (SPACH). This message is used to assign a mobile station to an analog voice channel in the 800 MHz hyperband in the depicted examples. The information elements filled by the processes of the present invention are SCC 1008 and CHAN 1012. SCC 1008 is an information element identifying the supervisory audio tone to be used on the assigned analog voice channel. The possible bit values in a TDMA system under IS 136 are bit value of 00 for 5970 Hz, bit value of 01 for 6000 Hz, bit value of 10 for 6030 Hz, and a bit value of 11 being reserved. CHAN 1012 is used to set a channel using IS 136 channel definitions for 800 Mhz and 900 MHz bands in the depicted examples.

In the depicted examples, the RF management function in the MSC takes the measurements returned by the mobile station to rank cells adjacent to the serving cell. These factors used to rank the cells include: (1) the signal strength of the adjacent control channels (ACCH and/or DCCH) as reported by the mobile station in the MACA report message during access; (2) determination of overload state of adjacent cells; (3) features available on adjacent cells that are also available on serving cell (e.g. authentication, teleservices); and (4) voice channel resource types available based on mobile station's dependencies (e.g. analog or digital).

Using these factors, the MSC prioritizes cells adjacent to the serving cell. In the depicted example, the prioritization is made in the following order:

1. If adjacent cell is in overload state, do not place on list.
2. If the adjacent cell does not offer the type of voice channel resources (analog or digital) that the mobile is requesting in the origination/page response message, do not place on list.
3. If the features that are offered on the serving cell are not offered on the adjacency (based on service provider configuration), place these adjacencies at the bottom of the list based on the best to worst signal strength.
4. Using the MACA report information sent up with the origination/page response, order the adjacencies that the mobile reported on in best to worse signal strength priority.

With reference now to FIG. 11, a diagram illustrating ranking of cells based on data returned by mobile station is depicted in accordance with a preferred embodiment of the present invention. Table 1100 ranks adjacent cells based on various factors. Specifically, table 1100 gives examples of rankings based on factors identified for adjacent cells. In this example, entry 1102 is ranked number one, which indicates that this cell is the best candidate. This particular cell is not in an overload state, offers the voice channel resources of the type requested by the mobile station, offers the same feature set as the service cell, and has the strongest signal strength reported by the mobile station in a MACA Report. Entry 1104 is ranked as the next best candidate and has all of the same prioritization factors as entry 1102 except cell entry 1104 has the second strongest signal strength reported by the mobile station in the MACA report. Entry 1106 provides all of the same factors as the previous entries, except entry 1106 has the Nth strongest signal strength as reported by the mobile station in a MACA report. In entry 1108, the cell identified by this entry does not offer the same feature set as a service call. This cell, however, has the strongest signal strength as reported by the mobile station in the MACA report. The same progression can be seen with respect to signal strength in entries 1110 and 1112. The prioritization of adjacent cells will continue in ranking candidates based on which factors are present. Additionally, a method is supplied by this invention that will allow the MSC Operator/Service Provider to configure a variable "RSSI threshold" on the MSC that can be compared to the best target's RSSI and determine if the call will be worth setting up at all. The MSC Operator/Service Provider would set this threshold to a value that they felt would allow the call to have acceptable quality after being redirected.

For example, in FIG. 11, candidate cell in entry 1102 has been determined to be the best candidate. Even though this entry is the best candidate, the mobile station may not see this adjacent channel strong enough to maintain "acceptable" call quality after being redirected (due to mobile station being too far from adjacent cell and not within adjacent cell's coverage area).

If the best candidate RSSI is not greater than the "RSSI threshold", the call is redirected, and a reorder message is sent to the mobile to fail the call and let the mobile station know that the system does not have any resources available to set up its call within the MSC. Also, a counter is incremented to count how often this scenario has occurred. RF engineers working to optimize the communications system can use these counters to re-engineer the amount of resources allocated to these calls.

Figure 12:
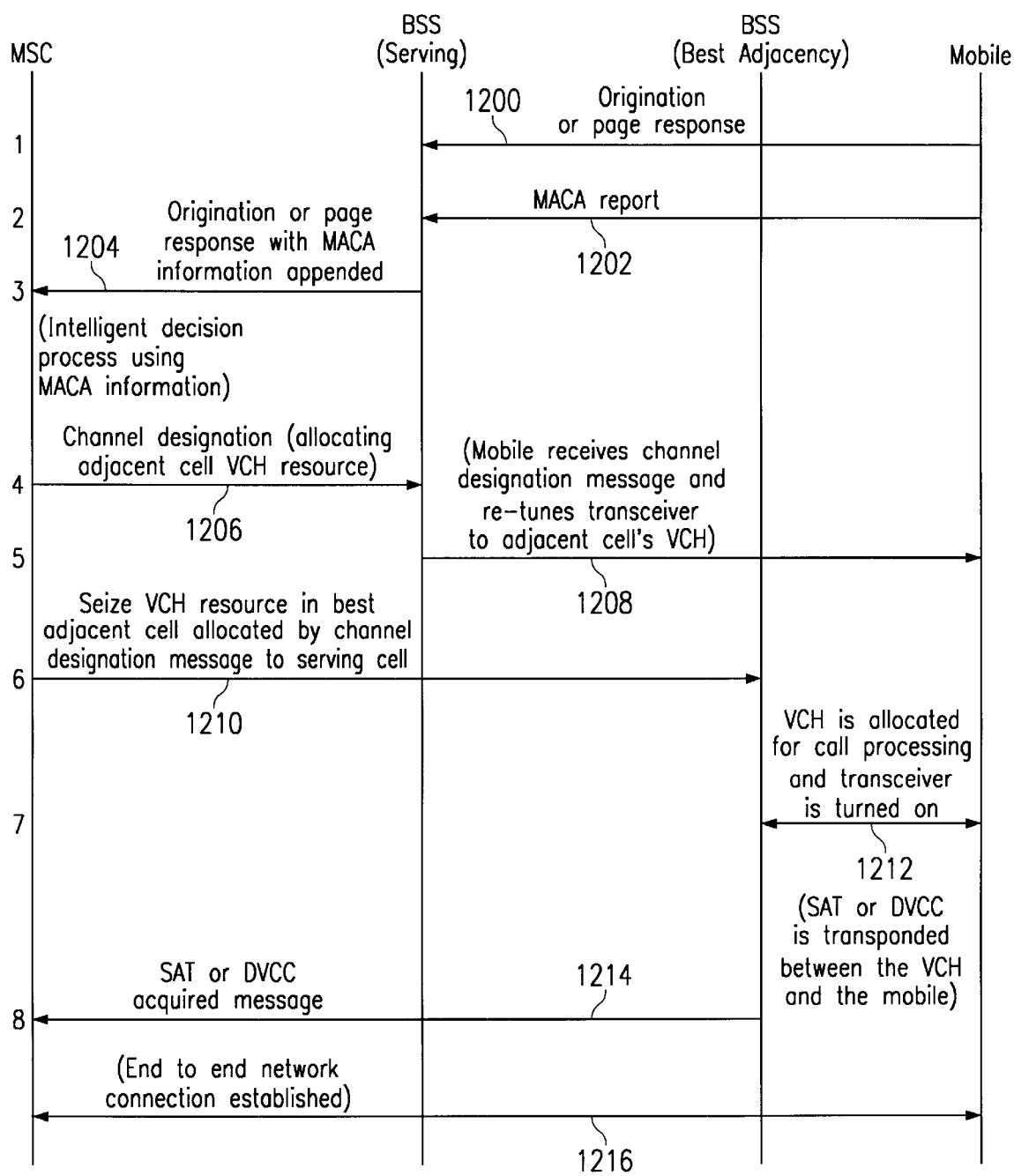
FIG. 12 is a message flow diagram for selecting a target cell using MACA information depicted in accordance with the preferred embodiment of the present invention.

In FIG. 12, a message flow diagram for selecting a target cell using MACA information is depicted in accordance with a preferred embodiment of the present invention. The message flow illustrated in FIG. 12 may be applied to the example in FIG. 4. A mobile station, such as mobile station 400 in FIG. 4, sends an origination or page response message to a serving BSS in the serving cell, such as 416 in cell 402 in FIG. 4 (step 1200). Additionally, the mobile station also will send a MACA report to the serving BSS (step 1202). The serving BSS in response to receiving the origination or page response and the MACA report, will send the origination or page response with the MACA information appended to a MSC, such as MSC 430 in FIG. 4 (step 1204). The MSC will then select the best cell for the mobile station using the MACA information along with other data the MSC has about features and resources available on adjacent cells.

Upon selecting an adjacent cell as the target cell, a channel designation is sent to the BSS, BSS 416 in FIG. 4, from the MSC, which allocates the adjacent cell VCH resource in the best adjacency (step 1206). In turn, the serving BSS will send the mobile station a channel designation message to cause the mobile station to retune the transceiver to the adjacent cell's VCH, such as the BSS 428 in cell 414 in FIG. 4 (step 1208). Additionally, the MSC also will send a message to the target BSS to seize the VCH resource using a seize VCH message to the BSS (step 1210). The VCH is allocated for call processing and the transceiver is turned on.

Next, supervisory auditory tone (SAT) or digital verification color code (DVCC) is transponded between the VCH and the mobile station (step 1212). These signals are used to ensure reliable voice communications. SATs are used in analog systems, while DVCCs are used in digital systems to ensure that the BTS and the mobile station know that they are communicating with each other over a VCH. When the SAT or DVCC is acquired, a SAT or DVCC acquired message is sent from the BSS to the MSC (step 1214). At that point, an end-to-end network connection between the MSC and the mobile station is established (step 1216).

Figure 13:
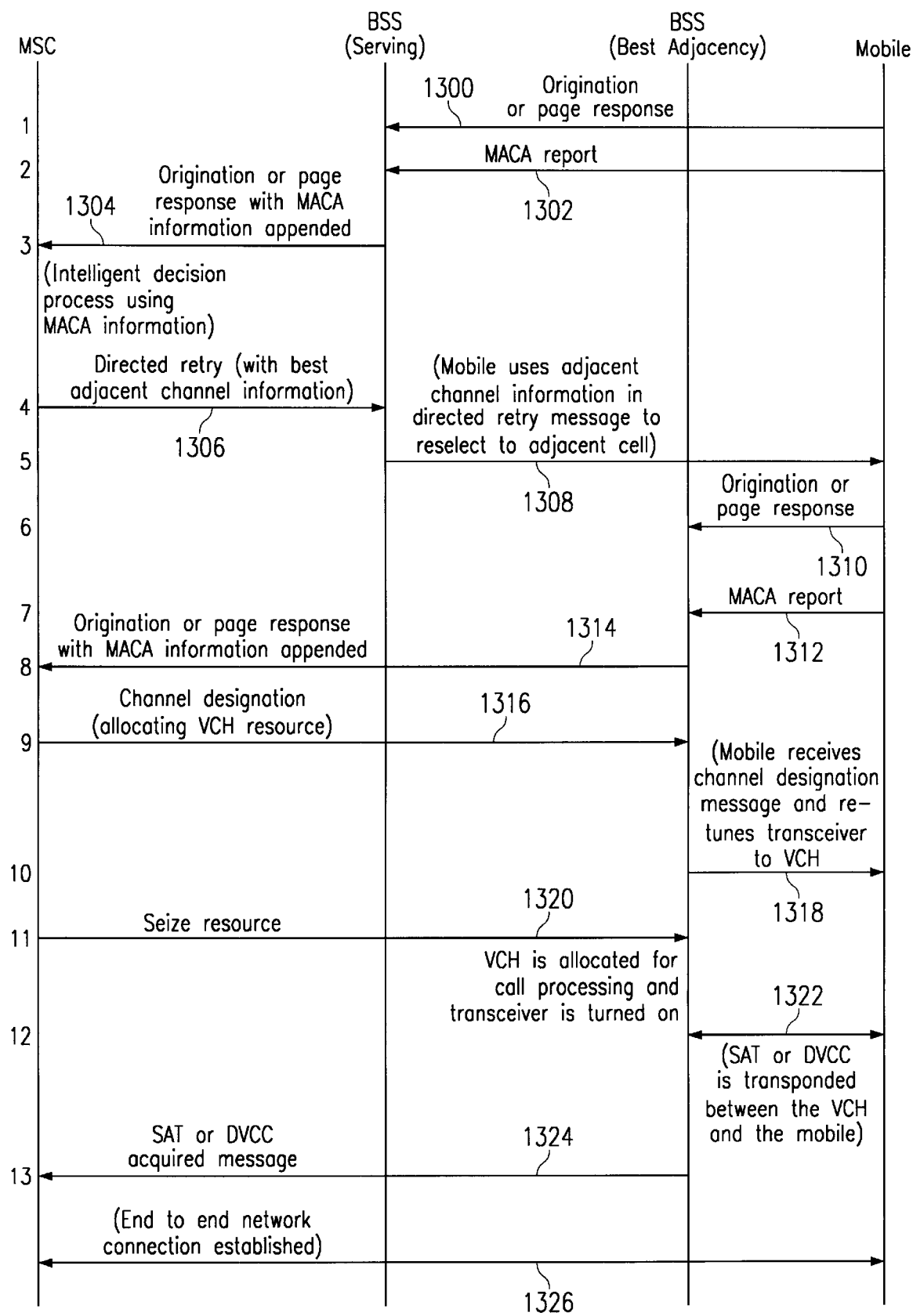
FIG. 13 is a message flow diagram illustrating a process for redirecting a call depicted in accordance with the preferred embodiment of the present invention.

With reference now to FIG. 13, a message flow diagram illustrating a process for redirecting a call is depicted in accordance with the preferred embodiment of the present invention. The process illustrated in FIG. 13 is an alternate process for redirecting a call. The redirection begins by a mobile station, such as mobile station 400 in FIG. 4 sending an origination or page response to a serving BSS in a serving cell, such as BSS 416 in cell 402 in FIG. 4 (step 1300). Additionally, a MACA report also is sent to the serving BSS from the mobile station (step 1302). In response to these signals from the mobile station, an origination or page response with MACA information appended is sent to the MSC, such as MSC 430 in FIG. 4 (step 1304). The MSC uses the MACA information to identify an adjacent cell to which the mobile station is to be redirected. The information includes a list of best-to-worst signal strengths in cells adjacent to the serving cell. A directed retry message with the best adjacent channel information is sent to the BSS serving the mobile station from the MSC (step 1306). The directed retry message is then relayed from the BSS DCCH to the mobile station (step 1308). This directed retry message contains adjacent channel information used by the mobile station to reselect an adjacent cell. In particular, the directed retry message includes a list of one or more cells selected by the MSC based on information returned from the mobile station. In the depicted example, a target cell, such as cell 414 in FIG. 4, is the cell having a highest priority in the list.

Upon selecting an adjacent cell as the target cell, the mobile station will send an origination or page response to the target BSS, such as BSS 428 in cell 414 in FIG. 4 (step 1310). Additionally, the mobile station also will send a MACA report to this BSS (step 1312). In response, the BSS will send an origination or page response with the MACA information appended to the MSC (step 1314). In response, the MSC will return a channel designation with a VCH resource to the BSS (step 1316). The mobile station will receive the channel designation message from the serving DCCH and retune its transceiver to the VCH (step 1318). Additionally, the MSC will seize the resource at the BSS for the selected VCH (step 1320). The VCH is allocated for call processing and the transceiver is turned on by this message received from the MSC. As a result, SAT or DVCC is transponded between the VCH and the mobile station (step 1322). At some point, the SAT or DVCC will be acquired and a SAT or DVCC acquired message is sent from the BSS to the MSC (step 1324). At this time, an end-to-end network connection is established between the MSC and the mobile station (step 1326).

Figure 14:
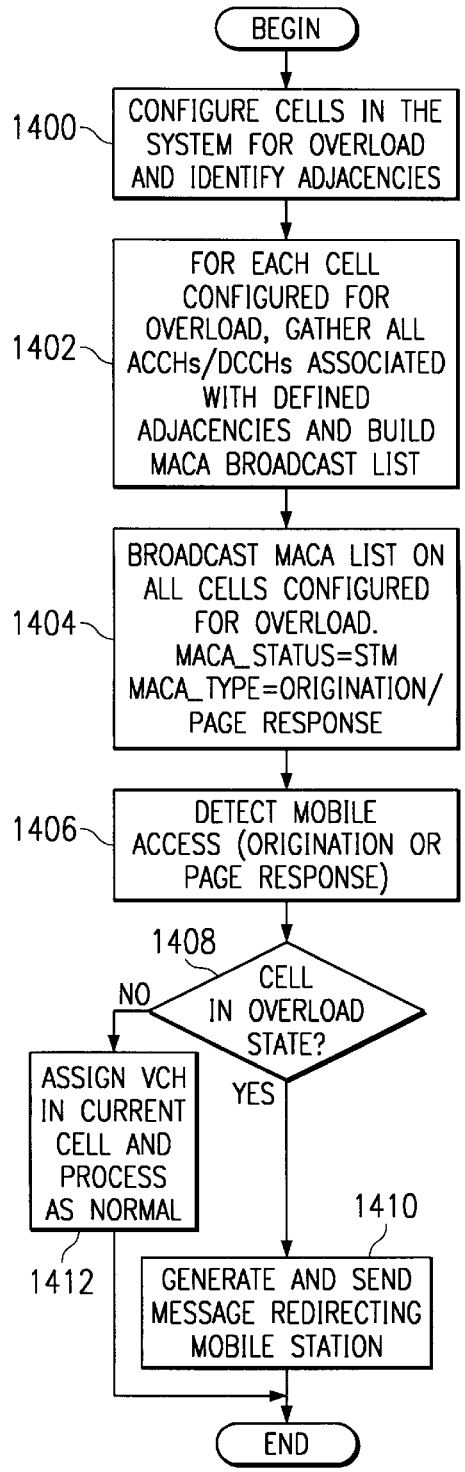
FIG. 14 is a flowchart of a process for selecting a channel for a mobile station depicted in accordance with the preferred embodiment of the present invention.
Figure 15:
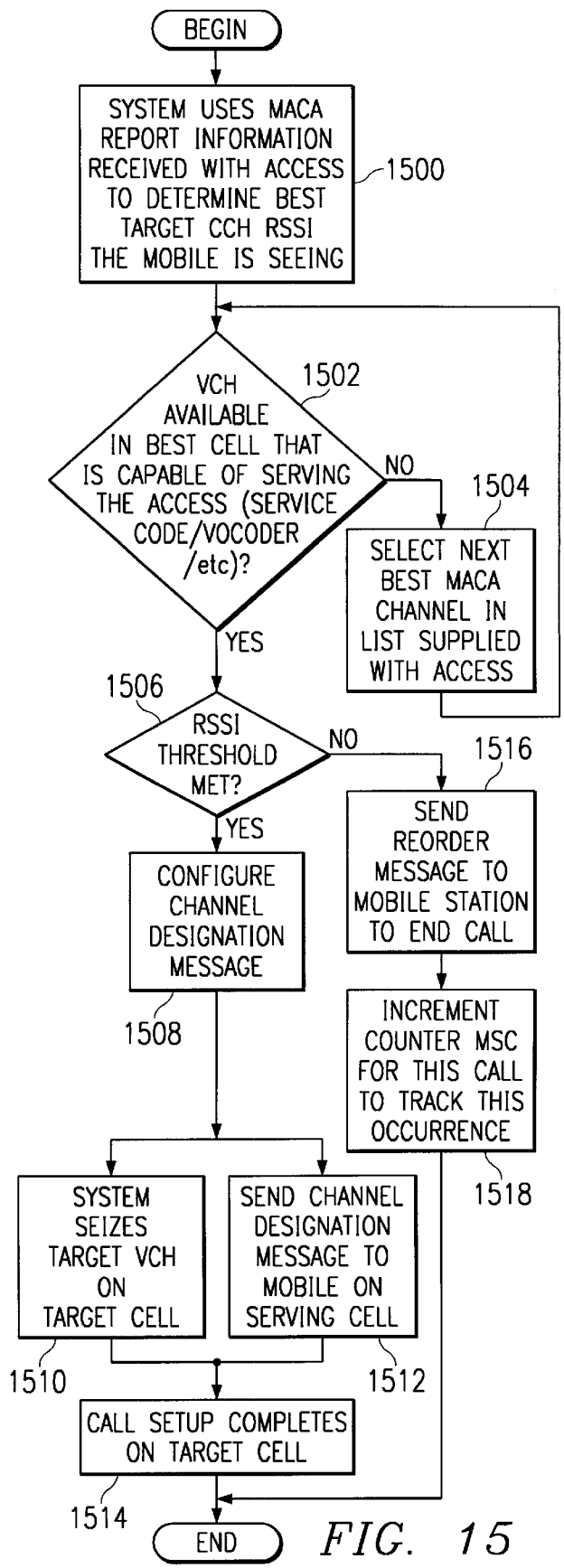
FIG. 15 is a flowchart of a process for identifying an adjacent cell and directing a mobile station to the cell depicted in accordance with the preferred embodiment of the present invention.
Figure 16:
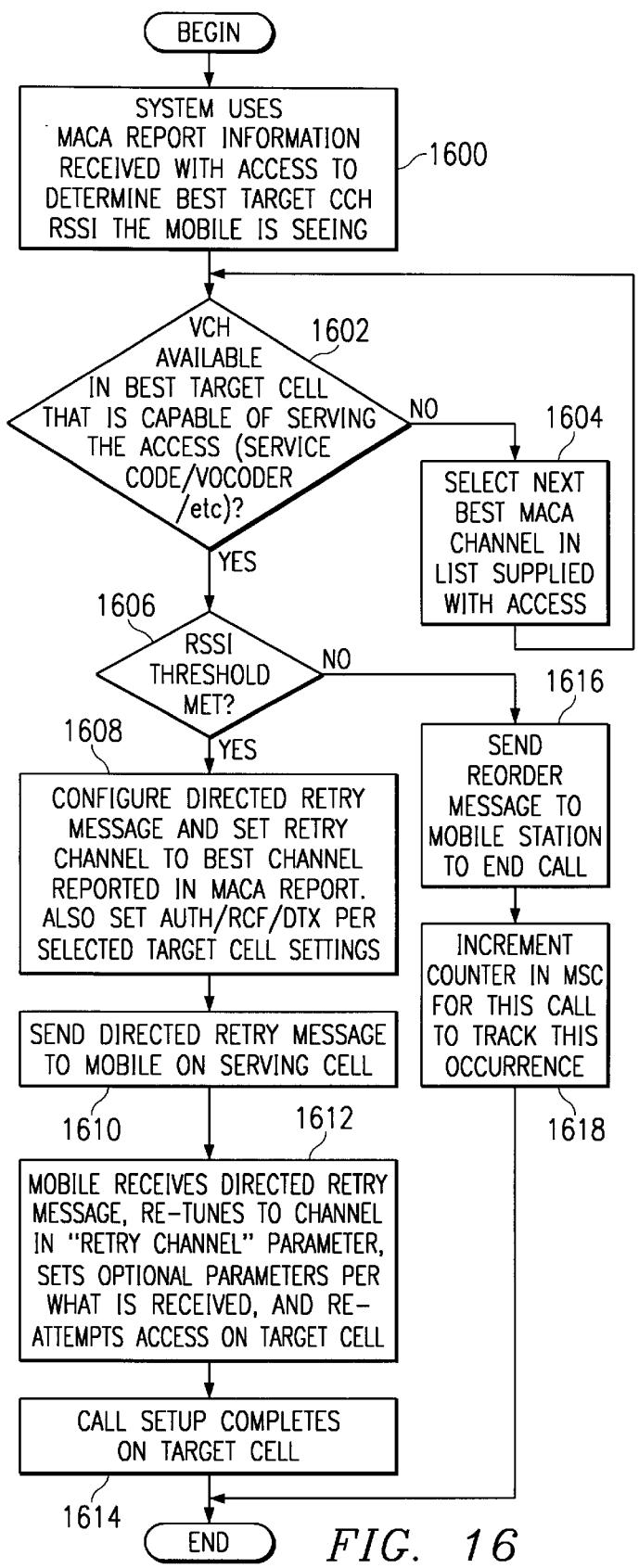
FIG. 16 is a flowchart of a process for redirecting a mobile station to another cell depicted in accordance with the preferred embodiment of the present invention.

In the flowcharts illustrated in FIGS. 14–16, these processes may be implemented in various components in a communications system. In accordance with a preferred embodiment of the present invention, the processes are implemented in a MSC.

With reference now to FIG. 14, a flowchart of a process for selecting a channel for a mobile station is depicted in accordance with a preferred embodiment of the present invention. This process may be implemented within an MSC in the depicted examples. The process begins by configuring cells in the system for overload and identifying adjacencies between the cells (step 1400). For each cell configured for overload, all ACCHs/DCCHs associated with defined adjacencies are gathered and a MACA broadcast list is built (step 1402). The MACA list is broadcast on all cells configured for overload (step 1404). Thereafter, mobile station access is detected (step 1406). In the depicted examples, this mobile station access is in the form of an origination or page response from the mobile station. A determination is then made as to whether the cell in which the mobile station is located is in an overload state (step 1408). If the cell is in an overload state, then a message is generated and sent to the mobile station to redirect the mobile station to another cell (step 1410) with the process terminating thereafter. If the cell is not in an overload state, then a VCH in the current cell is assigned and the call is processed normally (step 1412) with the process terminating thereafter.

With reference now to FIG. 15, a flowchart of a process for identifying an adjacent cell and directing a mobile station to the cell is depicted in accordance with a preferred embodiment of the present invention. The processes illustrated in FIG. 15 also may be implemented within an MSC. The flowchart in FIG. 15 is a more detailed illustration of step 1410 in FIG. 14.

The process begins by the communications system using MACA report information received with an access by a mobile station to identify the best target VCH RSSI that the mobile station sees (step 1500). The best target cell is identified using the signal strength information received from the mobile station along with other information about the cells. The information includes the resources and features available at the adjacent cells. A determination is then made as to whether a VCH existing in the best target cell is capable of serving the access made by the mobile station (step 1502). If a VCH does not exist in the best target cell or the right type of VCH does not exist, then the next best MACA channel in the list supplied with the access is selected (step 1504) with the process then returning to step 1502. Otherwise, a determination is made as to whether the RSSI threshold is met by the RSSI for the best cell (step 1506). The RSSI is the signal strength data returned by the mobile station. If the RSSI threshold is met, a channel designation message is configured for the target cell VCH (step 1508). Thereafter, the system seizes the target VCH on the target cell (step 1510) and the channel designation is sent to the mobile station on the serving cell (step 1512). Steps 1510 and 1512 occur in parallel in the depicted example. Thereafter, call set up completes on the target cell (step 1514) with the process terminating thereafter.

With reference again to step 1506, if the RSSI threshold is not met, then a reorder message is sent to the mobile station to end the call (step 1516). Thereafter, a counter is incremented in the MSC for this cell to track the occurrence (step 1518) with the process terminating thereafter.

With reference now to FIG. 16, a flowchart of a process for redirecting a mobile station to another cell is depicted in accordance with a preferred embodiment of the present invention. FIG. 16 is a more detailed description of step 1410 in FIG. 14. The process begins by the system using the MACA report information received with the access by the mobile station to identify the best target VCH received signal strength indicator (RSSI) seen by the mobile station (step 1600). Then, a determination is made as to whether a VCH is available in the best target cell that is capable of serving the access by the mobile station (step 1602). If such a VCH is not available, then the next best MACA channel in the list supplied with the access by the mobile station is selected (step 1604) with the process then returning to step 1602. This availability determination includes whether the cell is in an overload state.

With reference again to step 1602, if a VCH channel is available in the best target cell that is capable of serving the access made by the mobile station, then a determination is made as to whether an RSSI threshold has been met (step 1606). If the RSSI threshold is met, then a directed retry message is configured and the retry channel's parameter within the message is set to the best channel reported in the MACA report, and then authentication (AUTH)/read control filler (RCF)/discontinuous transmission (DTX) is set per selected target cell settings (step 1608). Thereafter, the directed retry message is sent to the mobile station on the serving cell (step 1610). Thereafter, the mobile station will retune to the channel in the retry channel parameter, set optional parameters, and reattempt access on the target cell in response to receiving the directed retry message (step 1612). Thereafter, call set up completes on the target cell to provide an end-to-end network connection between the MSC and the mobile station (step 1614) with the process terminating thereafter.

With reference to step 1606, if the RSSI threshold is not met, then a re-order message is sent to the mobile station to end the call (step 1616). Thereafter, a counter is incremented in the MSC for this cell to track the occurrence (step 1618) with the process terminating thereafter.

Figure 17:
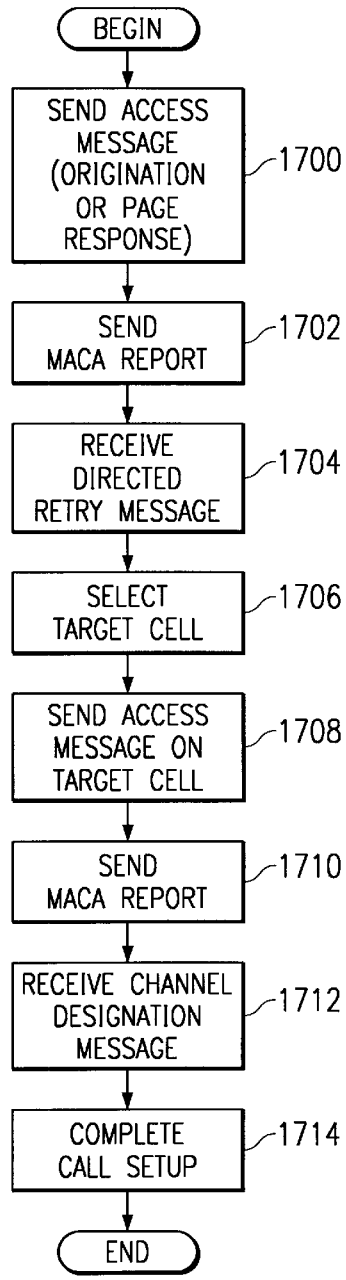
FIG. 17 is a flowchart of a process in a mobile station for accessing a voice channel (VCH) depicted in accordance with a preferred embodiment of the present invention.

In FIG. 17, a flowchart of a process in a mobile station for accessing a VCH is depicted in accordance with a preferred embodiment of the present invention. This process illustrates processes followed by a mobile station in establishing communication over a VCH in a target cell though a redirect message in response to an overload condition in the serving cell. The process begins by the mobile station sending an access message to the MSC (step 1700). A MACA report also is sent by the mobile station to the MSC along with the access message (step 1702). In response, a redirect message is received from the MSC (step 1704). The redirect message includes the optional retry channel parameter, which includes a list of adjacent target cells that may be accessed by the mobile station. The list is in order of priority with the highest priority or best cell being listed first in the depicted examples.

The mobile station then selects a target cell from the list (step 1706). This target cell is typically the cell listed as having the highest priority. If the signal strength, however, has changed and has become insufficient for use by the mobile station, the mobile station will select the next cell in the list. Next, the mobile station sends an access message to the target cell selected from the directed retry message (step 1708). A MACA report also is sent to the MSC through the target cell (step 1710). Thereafter, a channel designation is received for the target cell (step 1712). The mobile station then completes call setup with the target cell identified in the designation message (step 1714).

It is important to note that while the present invention has been described in the context of a fully functioning communications system, those of ordinary skill in the art will appreciate that the processes of the present invention are capable of being distributed in the form of a computer readable medium of instructions for use in data processing systems in a communications system and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the processes and apparatus of present invention are illustrated in a TDMA context, the processes and apparatus of the present invention may be implemented in other types of communications systems. For example, the present invention may be used in code division multiple access (CDMA) communications systems or global system for mobile communications (GSM) systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for redirecting a mobile, the method comprising:
   monitoring for an attempt by the mobile station to access a first cell in an overloaded state;
   obtaining information for cells adjacent to the first cell in response to detecting the attempt by the mobile station to access the first cell, wherein the information includes adjacent cell configuration information;
   identifying a second cell from the cells adjacent to the first cell using the information, wherein the second cell is an adjacent cell that is determined to not be in an overloaded state and is determined to provide one or more features requested by the mobile based on the adjacent cell configuration information; and
   sending a message to the mobile station to access the second cell.

2. The method of claim 1, wherein the message is a directed retry message including an identification of the second cell as the cell for the mobile station to access.

3. The method of claim 2, wherein the directed retry message includes a list of cells from the cells adjacent to the first cell, wherein the list of cells are cells in which an overload state is absent.

4. The method of claim 1, wherein the message is a channel designation message.

5. The method of claim 1, wherein the information is signal strength information for the cells.

6. The method of claim 5, wherein the signal strength information is for channels associated with the cells.

7. The method of claim 1, wherein the step of obtaining information comprises:
   receiving information for cells from the mobile station.

8. The method of claim 1 further comprising:
   allocating a voice channel in the second cell for use by the mobile station, which is currently in the first cell.

9. The method of claim 1, wherein the step of identifying a second cell from the cells adjacent to the first cell using the information includes:
   prioritizing cells based on parameters, wherein a best cell is identified; and
   comparing a received signal strength indicator for the cell with a threshold value; and
   responsive to a failure of the received signal strength indicator for the cell to meet the threshold value, ending the call.

10. A method in a communications system for redirecting a mobile station, the method comprising:
    receiving access to a cell by a mobile station;
    receiving information about a plurality of cells adjacent to the cell, wherein the information includes adjacent cell configuration information;
    identifying a target cell from the plurality of cells for the mobile station to access, wherein the target cell is an adjacent cell that is determined to not be in an overloaded state and is determined to provide one or more features requested by the mobile station based on the adjacent cell configuration information; and
    sending a message to the mobile station to access the target cell.

11. The method of claim 10, wherein the information is signal strength information about channels associated with the plurality of cells adjacent to the cell.

12. The method of claim 10, wherein the step of identifying a target cell comprises:
    identifying a set of cells from the plurality of cells in which an overload state is absent.

13. The method of claim 12 wherein the step of identifying a target cell further comprises:
    prioritizing cells within the set of cells based on signal strengths.

14. The method of claim 13, wherein the target cell is a cell having a highest priority within the set of cells.

15. The method of claim 12 wherein the step of identifying a target cell further comprises:
    prioritizing cells within the set of cells based on a type of voice channel resources requested by the mobile station.

16. The method of claim 12 wherein the step of identifying a target cell further comprises:
    prioritizing cells within the set of cells based on correspondence of features in the set of cells with features in the cell.

17. The method of claim 10, wherein the message is a message directing the mobile station to retry access on the target cell.

18. The method of claim 17, wherein the message is a directed retry message.

19. The method of claim 10, wherein the message is a message directing the mobile station to acquire a channel on the target cell.

20. The method of claim 19, wherein the message is a channel designation message.

21. The method of claim 10 further comprising:
    allocating a channel in the target cell for use by the mobile station, which is currently in the first cell.

22. A mobile switching center comprising:
    a network interface, wherein the network interface receives message from mobile stations;
    a management unit, wherein the management unit includes a plurality of modes of operation including:
      a first mode of operation in which the management unit monitors for access attempts by a mobile station to an overloaded cell;
      a second mode of operation, responsive to detecting access attempts by the mobile station, in which the management unit receives signal strength information from the mobile station for a plurality of cells adjacent to the overloaded cell and retrieves stored adjacent cell configuration information;
      a third mode of operation, responsive to receiving the signal strength information, in which the management unit identifies a target cell from the plurality of cells for the mobile station to access based on the signal strength information and the adjacent cell configuration information, the adjacent cell configuration information identifying the target cell as providing one or more features requested by the mobile station; and
      a fourth mode of operation, responsive to the identification of the target cell, in which the management unit sends a message through the network interface to the mobile station directing the mobile station to the target cell.

23. The mobile switching center of claim 22, wherein the management unit is a radio frequency management unit.

24. The mobile switching center of claim 22, wherein the management unit is a call processing unit.

25. The mobile switching center of claim 22, wherein the management unit identifies the target cell by identifying a set of cells from the plurality of cells in which an overload state is absent.

26. The mobile switching center of claim 25, wherein the management unit prioritizes cells within the set of cells based on signal strengths.

27. The mobile switching center of claim 26, wherein the target cell is a cell having a highest priority within the set of cells.

28. The mobile switching center of claim 25, wherein the management unit prioritizes cells within the set of cells based on a type of voice channel resources requested by the mobile station.

29. The mobile switching center of claim 25, wherein the management unit prioritizes cells within the set of cells based on correspondence of features in the set of cells with features in the cell.

30. The mobile switching center of claim 22, wherein the third mode of operation comprises:
    a first submode of operation in which the management unit prioritizes cells based on parameters, wherein a best cell is identified; and
    a second submode of operation,.responsive prioritizing of cells, in which the management unit compares a received signal strength indicator for the cell with a threshold value; and
    a third submode of operation, responsive to a failure of the received signal strength indicator for the cell to meet the threshold value, in which the management unit ends the call;
    a fourth submode of operation, responsive to the received signal strength indicator for the cell to meeting the threshold value, in which the management unit identifies the best cell as the target cell.

31. A communications system comprising:
    a mobile switching center; and
    a plurality of base substations connected to the mobile switching center, wherein the plurality of base substations is assigned to cells in the communications system, sends messages to mobile stations, and receives messages from the mobile stations,
    wherein in response to detecting an access message by a mobile station to an overloaded cell, receives signal strength information from the mobile station for a plurality of cells adjacent to the overloaded cell, identifies a target cell from the plurality of cells using the signal strength information and an identification of cells from the plurality of cells having operational features requested by the mobile station, and sends a message through the mobile station directing the mobile station to the target cell.

32. A communications system for redirecting a mobile station, the communications system comprising:
    monitoring means for monitoring for an attempt by the mobile station to access a first cell in an overloaded state;
    obtaining means for obtaining information for cells adjacent to the first cell in response to detecting the attempt by the mobile station to access the first cell, wherein the information includes adjacent cell configuration information;
    identifying means for identifying a second cell from the cells adjacent to the first cell using the information, wherein the second cell is an adjacent cell that is determined to not be in an overloaded state and is determined to provide one or more features requested by the mobile station based on the adjacent cell configuration information; and
    sending means for sending a message to the mobile station to access the second cell.

33. The communications system of claim 32, wherein the message is a directed retry message including an identification of the second cell as the cell for the mobile station to access.

34. The communications system of claim 33, wherein the directed retry message includes a list of cells from the cells adjacent to the first cell, wherein the list of cells are cell in which an overload state is absent.

35. The communications system of claim 32, wherein the message is a channel designation message.

36. The communications system of claim 32, wherein the information is signal strength information for the cells.

37. The communications system of claim 32, wherein the signal strength information is for channels associated with the cells.

38. The communications system of claim 32, wherein obtaining means comprises:
    receiving means for receiving information for cells from the mobile station.

39. The communications system of claim 32 further comprising:
    allocating means for allocating a voice channel in the second cell for use by the mobile station.

40. The communications system of claim 32, wherein the identifying means includes:
    prioritizing means for prioritizing cells based on parameters, wherein a best cell is identified; and
    comparison means for comparing a received signal strength indicator for the cell with a threshold value; and
    ending means for responsive to a failure of the received signal strength indicator for the cell to meet the threshold value, ending the call.

41. A communications system for redirecting a mobile station, the communications system comprising:
    first receiving means for receiving access to a cell by a mobile station;
    second receiving means for receiving information about a plurality of cells adjacent to the cell, wherein the information includes adjacent cell configuration information;
    identifying means for identifying a target cell from the plurality of cells for the mobile station to access, wherein the target cell is an adjacent cell that is determined to not be in an overloaded state and is determined to provide one or more features requested by the mobile station based on the adjacent cell configuration information; and
    sending means for sending a message to the mobile station to access the target cell.

42. The communications system of claim 41, wherein the information is signal strength information about channels associated with the plurality of cells adjacent to the cell.

43. The communications system of claim 41, wherein the identifying means comprises:

identifying means for identifying a set of cells from the plurality of cells in which an overload state is absent.

44. The communications system of claim 43 wherein the identifying means comprises:

prioritizing means for prioritizing cells within the set of cells based on signal strengths.

45. The communications system of claim 44, wherein the target cell is a cell having a highest priority within the set of cells.

46. The communications system of claim 43 wherein the identifying means comprises:

prioritizing means for prioritizing cells within the set of cells based on a type of voice channel resources requested by the mobile station.

47. The communications system of claim 43 wherein the identifying means comprises:

prioritizing means for prioritizing cells within the set of cells based on correspondence of features in the set of cells with features in the cell.

48. The communications system of claim 41, wherein the message is a message directing the mobile station to retry access on the target cell.

49. The communications system of claim 48, wherein the message is a directed retry message.

50. The communications system of claim 41, wherein the message is a message directing the mobile station to acquire a channel on the target cell.

51. The communications system of claim 50, wherein the message is a channel designation message.

52. The communications system of claim 41 further comprising:

allocating means for allocating a channel in the target cell for use by the mobile station.

53. A computer program product for use in a communications system for redirecting a mobile station, the computer program product comprising:

a computer readable medium;

first instructions for monitoring for an attempt by the mobile station to access a first cell in an overloaded state;

second instructions for obtaining information for cells adjacent to the first cell in response to detecting the attempt by the mobile station to access the first cell, wherein the information includes adjacent cell configuration information;

third instructions for identifying a second cell from the cells adjacent to the first cell using the information, wherein the second cell is an adjacent cell that is determined to not be in an overloaded state and is determined to provide one or more features requested by the mobile based on the adjacent cell configuration information; and fourth instructions for sending a message to the mobile station to access the second cell, wherein the instructions are embodied in the computer readable medium.

54. A computer program product in a communications system for redirecting a mobile station, the computer program product comprising:

a computer readable medium;

first instructions for receiving access to a cell by a mobile station;

second instructions for receiving information about a plurality of cells adjacent to the cell, wherein the information includes adjacent cell configuration information;

third instructions for identifying a target cell from the plurality of cells for the mobile station to access, wherein the target cell is an adjacent cell that is determined to not be in an overloaded state and is determined to provide one or more features requested by the mobile based on the adjacent cell configuration information; and fourth instructions for sending a message to the mobile station to access the target cell, wherein the instruction are embodied in the computer readable medium.

* * * * *